(12) United States Patent
Jeon

(10) Patent No.: US 12,472,042 B2
(45) Date of Patent: Nov. 18, 2025

(54) INTRAORAL SCANNER

(71) Applicant: ARCREAL INC., Seoul (KR)

(72) Inventor: Seung Hyun Jeon, Seoul (KR)

(73) Assignee: ARCREAL INC., Seoul (KR)

( * ) Notice: Subject to any disclaimer, the term of this patent is extended or adjusted under 35 U.S.C. 154(b) by 307 days.

(21) Appl. No.: 18/274,382

(22) PCT Filed: Dec. 9, 2021

(86) PCT No.: PCT/KR2021/018685
§ 371 (c)(1),
(2) Date: Jul. 26, 2023

(87) PCT Pub. No.: WO2022/164013
PCT Pub. Date: Aug. 4, 2022

(65) Prior Publication Data
US 2024/0090984 A1    Mar. 21, 2024

(30) Foreign Application Priority Data

Feb. 1, 2021    (KR) .......................... 10-2021-0014118

(51) Int. Cl.
*H04N 7/00* (2011.01)
*A61B 1/00* (2006.01)
(Continued)

(52) U.S. Cl.
CPC .......... *A61C 9/006* (2013.01); *A61B 1/00096* (2013.01); *A61B 1/24* (2013.01);
(Continued)

(58) Field of Classification Search
USPC .......................................................... 348/66
See application file for complete search history.

(56) References Cited

U.S. PATENT DOCUMENTS 11,528,463 B2 *  12/2022  Babayoff .............. H10F 39/156
2010/0253773 A1  10/2010  Oota et al.
(Continued)

FOREIGN PATENT DOCUMENTS

| JP | 2012512678 A | 6/2012 |
| JP | 2016511661 A | 4/2016 |

(Continued)

OTHER PUBLICATIONS

International Search Report—PCT/KR2021/018685 dated Mar. 18, 2022.

*Primary Examiner* — Nigar Chowdhury
(74) *Attorney, Agent, or Firm* — CANTOR COLBURN LLP

(57) ABSTRACT

An intraoral scanner is provided, including a case including an opening formed at one end thereof, a light source unit disposed at the other end of the case and emitting light toward the opening, a first optical system disposed in the opening and reflecting the light emitted from the light source unit toward a subject and reflecting light reflected from the subject toward the light source unit, a second optical system disposed between the light source unit and the first optical system and reflecting light reflected from the first optical system, and an image sensor unit that detects the light reflected from the second optical system.

10 Claims, 5 Drawing Sheets

(51) Int. Cl.
   *A61B 1/24* (2006.01)
   *A61C 9/00* (2006.01)
   *G02B 17/04* (2006.01)
   *G02B 17/06* (2006.01)
   *A61B 1/04* (2006.01)
   *A61B 1/06* (2006.01)

(52) U.S. Cl.
   CPC ............. *G02B 17/04* (2013.01); *G02B 17/06* (2013.01); *A61B 1/042* (2013.01); *A61B 1/0669* (2013.01)

(56) References Cited

U.S. PATENT DOCUMENTS

| | | | | |
|---|---|---|---|---|
| 2013/0236850 | A1* | 9/2013 | Wu | G01B 11/24 433/29 |
| 2014/0248576 | A1 | 9/2014 | Tchouprakov et al. | |
| 2018/0367786 | A1* | 12/2018 | Furst | G01J 3/0264 |
| 2019/0200006 | A1* | 6/2019 | Fisker | A61B 5/0068 |
| 2019/0388195 | A1* | 12/2019 | Hu | A61B 1/0623 |
| 2020/0069168 | A1* | 3/2020 | Tanaka | A61B 1/253 |
| 2020/0170497 | A1* | 6/2020 | Chang | H04N 23/55 |
| 2020/0205942 | A1* | 7/2020 | Pesach | G06V 20/653 |
| 2021/0045637 | A1 | 2/2021 | Chang et al. | |
| 2021/0085238 | A1* | 3/2021 | Schnabel | A61C 7/002 |
| 2021/0121049 | A1* | 4/2021 | Rudnitsky | A61B 1/00186 |
| 2021/0321872 | A1* | 10/2021 | Saphier | A61C 9/006 |
| 2025/0044079 | A1* | 2/2025 | Pesach | A61B 1/045 |

FOREIGN PATENT DOCUMENTS

| | | |
|---|---|---|
| KR | 101533341 B1 | 7/2015 |
| KR | 20180024477 A | 3/2018 |
| KR | 20180032723 A | 4/2018 |
| KR | 101874547 B1 | 7/2018 |
| KR | 102341890 B1 | 12/2021 |
| WO | 2010079083 A1 | 7/2010 |

* cited by examiner

INTRAORAL SCANNER

BACKGROUND

Technical Field

The present disclosure relates to an intraoral scanner, and more particularly, to an intraoral scanner configured to acquire a 3D image of an oral cavity.

Description of Related Art

For the today's digitized dental treatment, the digital impression is an important beginning stage. As the importance of digital impressions increases in the dental treatment, technical development of intraoral scanners is also actively achieved.

The intraoral scanner is a device or system that is inserted into the oral cavity of a patient and scans the 3D structure of teeth in a non-contact manner. The recently developed intraoral scanner can capture 2D image data of the oral cavity, and perform 3D modeling of the oral structure based on the 2D image data. The applications of the intraoral scanners having these functions have expanded to the clinical practices, and the intraoral scanner can be used not only for dental restoration treatment, but also for manufacturing of implants and orthodontic devices.

Meanwhile, the accuracy of the impression is important for successful dental treatment. The digital impressions captured through the intraoral scanner do have deformation due to contraction or expansion of impression materials, and thus have higher impression accuracy than the traditional impressions using the existing impression materials. Meanwhile, it is necessary to further improve the accuracy of scanning to use the intraoral scanner as a sophisticated dental treatment tool. In addition, since the intraoral scanner is used while being inserted in the oral cavity of the patient in a non-contact manner, it is desirable that the intraoral scanner preferably has a structure that allows the patient to feel comfortable while the intraoral scanner is in use.

SUMMARY

In order to solve one or more problems (e.g., the problems described above and/or other problems not explicitly described herein), the present disclosure provides an intraoral scanner including a plurality of optical systems disposed therein so as to achieve a structure suitable for insertion into and use in the oral cavity of a patient in a non-contact manner.

The intraoral scanner may include a case including an opening formed at one end thereof, a light source unit disposed at the other end of the case and emitting light toward the opening, a first optical system disposed in the opening and reflecting the light emitted from the light source unit toward a subject and reflecting light reflected from the subject toward the light source unit, a second optical system disposed between the light source unit and the first optical system and reflecting light reflected from the first optical system, and an image sensor unit that detects the light reflected from the second optical system.

A gap may be formed in a center of the second optical system such that the light emitted from the light source unit may pass through the gap to reach the first optical system.

The second optical system may include a first reflector configured to reflect the light reflected from the first optical system, and a second reflector configured to reflect the light reflected by the first reflector toward the image sensor unit.

The first reflector may include two reflective surfaces configured such that a dihedral angle between each infinite plane forms a minor angle, and the second reflector may include two reflective surfaces configured such that a dihedral angle between each infinite plane forms a major angle.

Positions and directions of each of the two reflective surfaces of the second reflector may be set such that two images of the subject reflected by the two reflective surfaces of the second reflector and detected by the image sensor unit do not overlap with each other.

The second optical system may include a first prism and a second prism, the light emitted from the light source unit may pass through a gap formed between the first prism and the second prism to reach the first optical system, and the light reflected by the first optical system may be reflected by a pair of opposing reflective surfaces of the first prism and a pair of opposing reflective surfaces of the second prism to reach the image sensor unit.

A dihedral angle between an infinite plane of one reflective surface of the first prism and an infinite plane of one reflective surface of the second prism may form a minor angle, and a dihedral angle between an infinite plane of the other reflective surface of the first prism and an infinite plane of the other reflective surface of the second prism may form a major angle.

Positions and directions of the other reflective surface of the first prism and the other reflective surface of the second prism may be set such that two images of the subject reflected by the two other reflective surfaces and detected by the image sensor unit do not overlap with each other.

The light source unit may be configured to emit patterned light or structured light.

The image sensor unit may be configured to acquire two stereo images from the image of the light reflected from the second optical system.

According to various examples of the present disclosure, it is not necessary to provide a driving unit for adjusting the angle of each of the plurality of optical systems arranged inside the case of the intraoral scanner, and accordingly, the optical systems can be densely arranged in optimal positions inside the case.

In addition, according to various examples of the present disclosure, since it is possible to arrange a plurality of optical systems inside the case in a dense structure, an intraoral scanner with a small volume can be implemented, so that the intraoral scanner can be easily inserted into the oral cavity of a patient and easily moved or changed in direction in the oral cavity during use and perform precise tooth scanning.

In addition, according to various examples of the present disclosure, since it requires only one image sensor unit to acquire two stereo images from the images of light reflected from a plurality of optical systems, the manufacturing cost of the intraoral scanner can be reduced and internal configuration can be further optimized.

The effects of the present disclosure are not limited to the effects described above, and other effects that are not mentioned above can be clearly understood to those skilled in the art based on the description provided below.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
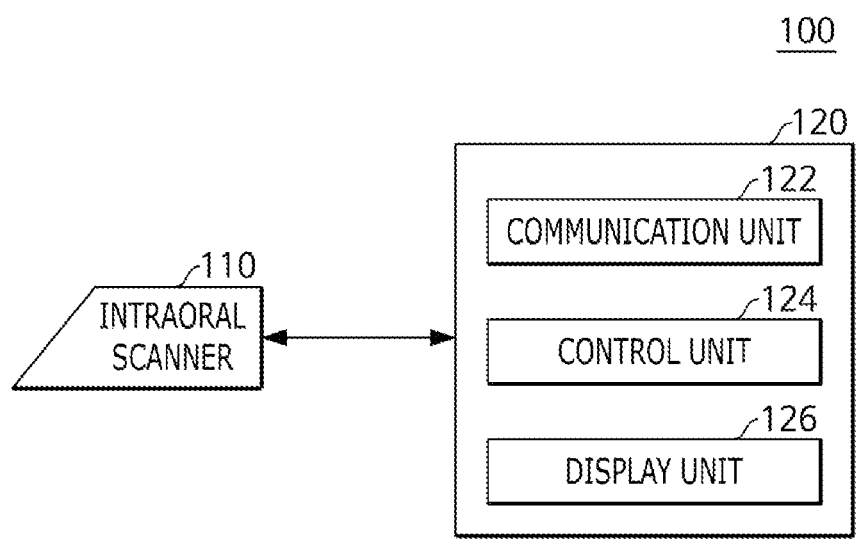
FIG. 1 is a schematic diagram showing a configuration in which an intraoral scanner is connected to an oral 3D modeling and visualization system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

The terms used in the present disclosure will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, in which case the meaning of the terms will be described in detail in a corresponding description of the example(s). Therefore, the terms used in the present disclosure should be defined based on the meaning of the terms and the overall content of the present disclosure rather than a simple name of each of the terms.

In the present disclosure, the singular forms "a," "an," and "the" are intended to include the plural forms as well, unless the context clearly indicates the singular forms. Further, the plural forms are intended to include the singular forms as well, unless the context clearly indicates the plural forms.

In the present disclosure, when a portion is stated as "comprising (including)" a component, unless specified to the contrary, it intends to mean that the portion may additionally comprise (or include or have) another component, rather than excluding the same.

In the present disclosure, it is to be noted that the upper direction of the drawing may be referred to as "upper portion" or "upper side" of the configuration shown in the drawing, and the lower direction may be referred to as "lower portion" or "lower side". In addition, in the drawings, a portion between the upper and lower portions of the configuration shown in the drawings, or a portion other than the upper and lower portions may be referred to as "side portion" or "side". Relative terms such as "upper portion" and "upper side" may be used to describe the relationship between components shown in the drawings, and the present disclosure is not limited by these terms.

In the present disclosure, a direction toward the inner space of a structure may be referred to as "inside", and a direction projecting into the open outer space may be referred to as "outside". Relative terms such as "inside" and "outside" may be used to describe the relationship between components shown in the drawings, and the present disclosure is not limited by these terms.

In the present disclosure, the statement "A and/or B" means "A", or "B", or "A and B".

In the present disclosure, when a portion is stated as being connected to another portion, it intends to include not only an example in which the portions are directly connected, but also an example in which the portions are connected while having another component disposed therebetween.

Further, the term "module" or "unit" used in the present disclosure refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, segments of program code, drivers, firmware, micro-codes, circuits, data, database, data structures, tables, arrays, or variables. Furthermore, functions provided in the components and the "modules" or "units" may be combined into a smaller number of components and "modules" or "units", or further divided into additional components and "modules" or "units."

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

FIG. 1 is a schematic diagram 100 showing a configuration in which an intraoral scanner 110 is connected to an oral 3D modeling and visualization system 120.

For example, the intraoral scanner 110 may be inserted into the oral cavity of a patient by a practitioner to scan the teeth in a non-contact manner to capture a plurality of 2D image data. In addition, the intraoral scanner 110 may transmit a plurality of captured 2D image data to the system 120 or perform 3D oral structure modeling on its own based on the 2D image data.

The intraoral scanner 110 may be connected to the system through a network that is communicatively connected by wired or wireless manner. The network may be configured as a wired network such as an electrical connection line such as a copper cable, Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment.

The intraoral scanner 110 may exchange information, data such as 2D image data and 3D oral structure model data, etc. with the system 120. The intraoral scanner 110 and the system 120 may be physically separately configured from each other as shown, but aspects are not limited thereto. For example, the intraoral scanner 110 and the system 120 may be integrated into a single computing device.

The system 120 may analyze at least two 2D image data or stereo images acquired from the intraoral scanner 110 to perform 3D oral structure modeling. In order to perform the above functions, the system 120 may include a computing device including a processor (e.g., CPU, GPU, etc.) capable of performing image processing and 3D modeling and a memory capable of storing 2D image data or 3D oral structure model data. As shown, the system 120 may include a communication unit 122, a control unit 124, and a display unit 126. The communication unit 122 may be configured to transmit and receive information, data, etc. with the intraoral scanner 110. Specifically, the communication unit 122 may transmit a command signal of the control unit 124 to the intraoral scanner 110 and receive image information of a target oral structure from the intraoral scanner 110.

The control unit 124 may control the intraoral scanner 110 to capture an image of the target oral structure. Specifically, the control unit 124 may control a light source unit installed in the intraoral scanner 110 (e.g., 220 in FIG. 2) to emit light toward at least one of a plurality of optical systems. In addition, the control unit 124 may control an image sensor unit (e.g., 260 in FIG. 2) installed in the intraoral scanner 110 to detect the light reflected by at least one of a plurality of optical systems. The control unit 124 may control the image sensor unit to acquire two stereo images from the detected light image. The control unit 124 may control the display unit 126 to display two stereo images acquired from the image sensor unit. In addition, the control unit 124 may control so that 3D oral structure model data calculated from the two stereo images is visualized and displayed on the display unit 126.

The display unit 126 may display the information, data, etc. transmitted from the intraoral scanner 110 or the control unit 124 in the form of images. The image displayed on the display unit 126 may include two stereo images or an image of the 3D oral structure model. The display unit 126 may include a display panel device such as an LED display, an OLED display, an LCD display, a touch display, etc.

Figure 2:
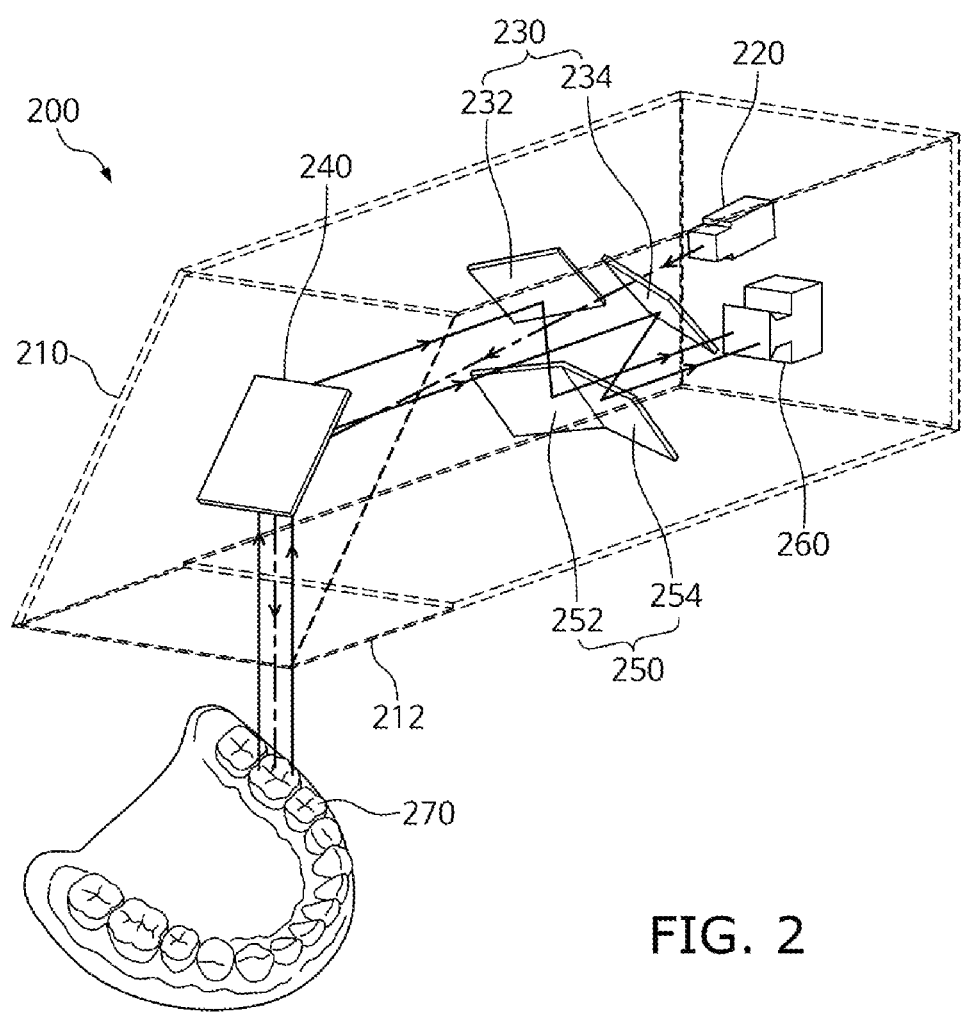
FIG. 2 is a transparent perspective view of the intraoral scanner.

FIG. 2 is a transparent perspective view of an intraoral scanner 200. As shown in FIG. 2, the intraoral scanner 200 may include a case 210, the light source unit 220, a first optical system 240, second optical systems 230 and 250, and the image sensor unit 260.

The case 210 forms the exterior of the intraoral scanner 200 and may be configured to accommodate therein the light source unit 220, the first optical system 240, the second optical systems 230 and 250, and the image sensor unit 260. As shown in FIG. 2, the case 210 may have a shape of a trapezoidal box extending in approximately one longitudinal direction, but is not limited thereto. For example, the case 210 may be formed in a rectangular parallelepiped shape, a cylindrical shape, a streamlined shape, or any shape suitable for insertion into the oral cavity.

An opening 212 may be formed at one end of the case 210. Specifically, the opening 212 may include an open portion formed at one end of the case 210. In this case, the open portion of the opening 212 may be configured to allow the light generated or reflected inside the case 210 to be emitted to the outside and allow external light to be introduced into the case 210. The opening 212 may be configured such that, when the intraoral scanner 200 is inserted into the oral cavity, the opening 212 is positioned at the innermost part of the oral cavity.

The light source unit 220 may be configured to emit light toward the opening 212. In this case, the light emitted from the light source unit 220 may include patterned or structured light. The pattern of the light may be a straight line pattern, a dot pattern, or a pattern of any shape. If the patterned light is emitted to a subject 270 such as teeth in the oral cavity, a deformation of corresponding pattern may occur according to the 3D structure of the surface of the subject 270. Accordingly, the deformation or location information of the pattern formed on the surface of the subject 270 may be used to identify and model the 3D structure of the subject 270.

The light source unit 220 may be disposed at the other end of the case 210. Specifically, the light source unit 220 may be accommodated at the other inner end of the case 210 opposite the one end of the case 210 where the opening 212 is formed. For example, the light source unit 220 may be fixedly disposed above the other inner end of the case 210.

The light source unit 220 may be disposed at one end of the case 210, but is not limited thereto. For example, the light source unit 220 may be disposed at any intermediate point between the one and other ends of the case 210. That is, the light source unit 220 may be disposed at any position within the case 210 where it is easy to emit light toward the opening 212. The light source unit 220 may be spaced apart from a first reflector 230 at an appropriate distance for easy scanning. For example, the light source unit 220 may be disposed as close to the first reflector 230 as possible.

The first optical system 240 may be configured to reflect the light emitted from the light source unit 220 toward the subject 270 and reflect the light reflected from the subject 270 toward the light source unit 220 or the second optical systems 230 and 250. The first optical system 240 may include at least one reflector. For example, the first optical system 240 may include at least one mirror. The first optical system 240 may be disposed at or around the opening 212. For example, the first optical system may be fixedly disposed on an inner surface of the opening 212.

The second optical systems 230 and 250 may be configured to reflect the light reflected from the first optical system 240. Specifically, the second optical systems 230 and 250 may reflect the light reflected from the first optical system 240 toward the image sensor unit 260. In this case, the second optical systems 230 and 250 may reflect the light one or more times.

The second optical systems 230 and 250 may be disposed between the light source unit 220 and the first optical system 240. Specifically, the light source unit 220 and the first optical system 240 may be fixedly disposed at both ends of the internal space of the case 210, and the second optical systems 230 and 250 may be fixedly disposed at any position in the middle.

A gap (or optical path) may be formed in the center between the second optical systems 230 and 250, so that the light emitted from the light source unit 220 may pass through the gap to reach the first optical system 240. In another example, when the gap is not formed in the center between the second optical systems 230 and 250, the light emitted from the light source unit 220 may bypass the second optical systems 230 and 250 and reach the first optical system 240.

As shown in FIG. 2, the second optical systems 230 and 250 may include the first reflector 230 and a second reflector 250. The first reflector 230 may be configured to reflect light reflected from the first optical system 240. The first reflector 230 may be fixedly disposed on an inner upper portion of the case 210. The first reflector 230 may include two reflective surfaces 232 and 234. The two reflective surfaces 232 and 234 may reflect the light reflected from the first optical system 240 toward the second reflector 250. In addition, a gap may be formed between the two reflective surfaces 232 and 234, so that the light emitted from the light source unit 220 may pass through the gap and reach the first optical system 240.

The second reflector 250 may be configured to reflect the light reflected by the first reflector 230 toward the image sensor unit 260. The second reflector 250 may be fixedly disposed on an inner lower portion of the case 210. The second reflector 250 may include two reflective surfaces 252 and 254. The two reflective surfaces 252 and 254 may reflect the light reflected from the first reflector 230 toward the image sensor unit 260.

The position, direction, etc. of each of the two reflective surfaces 252 and 254 of the second reflector 250 may be appropriately set such that two images of the subject 270 that are each reflected by the two reflective surfaces 252 and 254 of the second reflector 250 and detected by the image sensor unit 260 do not overlap with each other. For example, two images detected by the image sensor unit 260 from the light reflected by the two reflective surfaces 252 and 254 of the second reflector 250 may each include one image of the subject 270. In this case, the positions, directions, etc. of the two reflective surfaces 252 and 254 may be set such that the two images of the subject 270 detected by the image sensor unit 260 do not overlap with each other.

A driving unit for adjusting an angle of the first optical system 240 or the second optical systems 230 and 250 may not be installed in the case 210. In this case, it is not necessary to dispose other electronic or mechanical components in the area inside the case where the first optical system 240 and the second optical systems 230 and 250 are disposed, and accordingly, it is possible to densely arrange the components inside the case. Therefore, since the optimal structure of the case 210 can be designed with the dense structure of the first optical system 240 and the second optical systems 230 and 250, it is possible to implement the intraoral scanner 200 having a free scanning motion in the oral cavity and having a small volume.

The orientation of each normal vector of the reflective surfaces 232 and 234 of the first reflector 230 and the orientation of each normal vector of the reflective surfaces 232 and 234 of the second reflector 250 may be appropriately adjusted such that light reflected from the subject 270 may be guided to the image sensor unit 260. A dihedral angle between infinite planes of each of the reflective surfaces 232 and 234 of the first reflector 230 may correspond to a minor angle, that is, an angle smaller than 180 degrees, and a dihedral angle between the infinite planes of the reflective surfaces 252 and 254 of the second reflector 250 may correspond to a major angle, that is, an angle greater than 180 degrees. Alternatively, the dihedral angle between the infinite planes of each of the reflective surfaces 232 and 234 of the first reflector 230 may correspond to a major angle, and the dihedral angle between the infinite planes of the reflective surfaces 252 and 254 of the second reflector 250 may correspond to a minor angle.

The image sensor unit 260 may be configured to detect the light reflected from the second optical systems 230 and 250. The image sensor unit 260 may be configured to acquire two stereo images from the light reflected from the second optical systems 230 and 250. Specifically, the image sensor unit 260 may acquire together the images of the two lights respectively reflected by the two reflective surfaces 252 and 254 of the second reflector 250. As described above, the intraoral scanner 200 includes the second optical systems 230 and 250 having a plurality of reflective surfaces 232, 234, 252, and 254 and thus can acquire two stereo images with only one image sensor unit 260. The two stereo images acquired from the image sensor unit 260 may be used for 3D oral structure modeling that is executed by a processor.

The image sensor unit 260 may be disposed on the other end of the case 210. Specifically, the image sensor unit 260 may be accommodated at the other inner end of the case 210 to face the one end of the case 210 where the opening 212 is formed. For example, the image sensor unit 260 may be fixedly disposed on the inner lower portion of the case 210 adjacent to the light source unit 220.

Although it has been described above that the first reflector 230 is fixedly disposed on the inner upper portion of the case 210 and the second reflector 250 is fixedly disposed on the inner lower portion of the case 210, aspects are not limited thereto. For example, the first reflector 230 may be fixedly disposed on the inner lower portion of the case 210 and the second reflector 250 may be fixedly disposed on the inner upper portion of the case 210. In this case, the light source unit 220 may be fixedly disposed on an inner lower portion of the other end of the case 210, and the image sensor unit 260 may be fixedly disposed on an inner upper portion of the case 210 adjacent to the light source unit 220.

Figure 3:
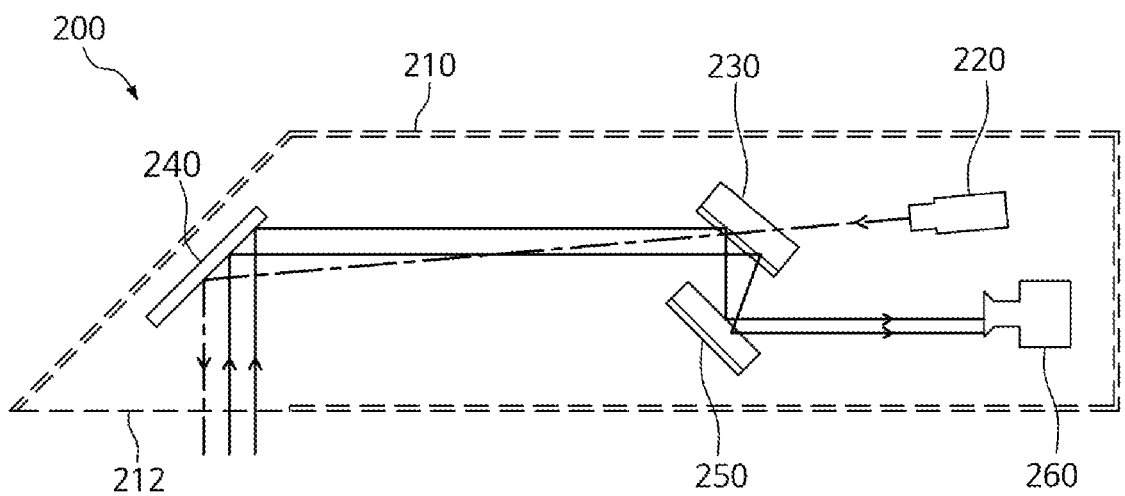
FIG. 3 is a transparent side view of the intraoral scanner.

FIG. 3 is a transparent side view of the intraoral scanner 200. The descriptions of the components shown in FIG. 3 that correspond to the components shown in FIG. 2 will be omitted.

Light may be emitted from the light source unit 220 and pass through the gap of the first reflector 230. The light passed through the gap of the first reflector 230 may be reflected toward the subject by the first optical system 240. In this case, the light may pass through the open portion formed on one side of the opening 212. The light reflected from the subject may be reflected toward the first reflector 230 by the first optical system 240. The light reflected by the first reflector 230 may be reflected toward the image sensor unit 260 by the second reflector 250.

Additionally, the intraoral scanner 200 may acquire an image of the subject using light emitted from an additional light source other than the light source unit 220. For example, the light emitted from an additional light source installed in the intraoral scanner 200 or from an external additional light source may be reflected on the subject and reach the first optical system 240. The light reflected from the first optical system 240 may be sequentially reflected by the first reflector 230 and the second reflector 250 and reach the image sensor unit 260.

Figure 4:
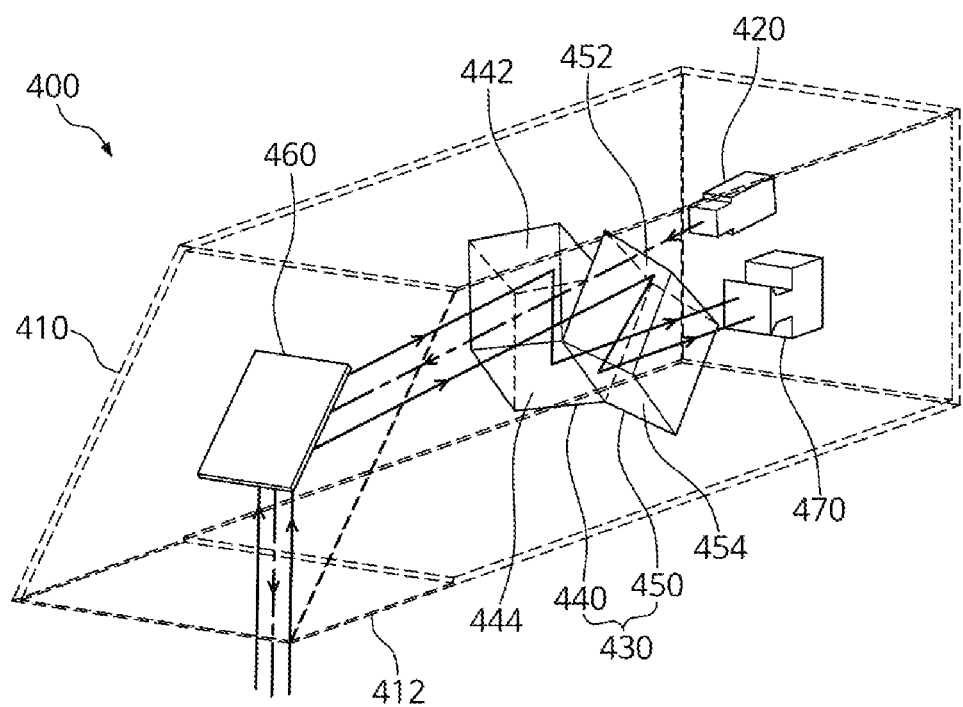
FIG. 4 is a transparent perspective view of an intraoral scanner.

FIG. 4 is a transparent perspective view of an intraoral scanner 400. The descriptions of the components shown in FIG. 4 that correspond to the components shown in FIG. 2 will be omitted. As shown in FIG. 4, the intraoral scanner 400 may include a case 410, a light source unit 420, a first optical system 460, a second optical system 430, and an image sensor unit 470.

The second optical system 430 may reflect light reflected from the first optical system 460 toward the image sensor unit 470. In this case, the second optical system 430 may reflect the light one or more times.

The second optical system 430 may be disposed between the light source unit 420 and the first optical system 460. Specifically, the light source unit 420 and the first optical system 460 may be fixedly disposed at both ends of the internal space of the case 410, and the second optical system 430 may be fixedly disposed at any position in the middle.

Unlike the second optical systems 230 and 250 of FIG. 2, the second optical system 430 may include a pair of prisms. As shown in FIG. 4, the second optical system 430 may include a first prism 440 and a second prism 450.

A gap (or optical path) is formed between the first prism 440 and the second prism 450, so that the light emitted from the light source unit 420 may pass through the gap described above and reach the first optical system 460. If a gap is not formed between the first prism 440 and the second prism 450, the light emitted from the light source unit 420 may pass through the second optical system 430 and reach the first optical system 460.

As shown in FIG. 4, the first prism 440 may include a pair of opposing reflective surfaces 442 and 444, and the second prism 450 may include a pair of opposing reflective surfaces 452 and 454. The upper reflective surface 442 of the first prism 440 and the upper reflective surface 452 of the second prism 450 may reflect the light reflected from the first optical system 460 toward the lower reflective surface 444 of the first prism 440 and the lower reflective surface 454 of the second prism 450, respectively. In addition, the lower reflective surface 444 of the first prism 440 and the lower reflective surface 454 of the second prism 450 may reflect the light reflected from the upper reflective surface 442 of the first prism 440 and the upper reflective surface 452 of the second prism 450 toward the image sensor unit 470, respectively. Accordingly, the light reflected by the first optical system 460 may be reflected by the pair of opposing reflective surfaces 442 and 444 of the first prism 440 and the pair of opposing reflective surfaces 452 and 454 of the second prism 450 and reach the image sensor unit 470.

The position, orientation, etc. of each of the lower reflective surface 444 of the first prism 440 and the lower reflective surface 454 of the second prism 450 may be appropriately set such that two images of the subject respectively reflected by the two lower reflective surfaces 444 and 454 and detected by the image sensor unit 470 do not overlap with each other. For example, each of the two images detected by the image sensor unit 470 from light reflected by the two lower reflective surfaces 444 and 454 may include one image of the subject. In this case, the positions, directions, etc. of the two lower reflective surfaces 444 and 454 may be set such that the two images of the subject detected by the image sensor unit 470 do not overlap with each other.

The orientation of each normal vector of the reflective surfaces 442 and 444 of the first prism 440 and the orientation of each normal vector of the reflective surfaces 452 and 454 of the second prism 450 may be appropriately adjusted such that light reflected from the subject may be guided to the image sensor unit 470. A dihedral angle between an infinite plane of one reflective surface 442 of the first prism 440 and an infinite plane of one reflective surface 452 of the second prism 450 may correspond to a minor angle, and a dihedral angle between an infinite plane of the other reflective surface 444 of the first prism 440 and an infinite plane of the other reflective surface 454 of the second prism 450 may correspond to a major angle. Alternatively, the dihedral angle between the infinite plane of one reflective surface 442 of the first prism 440 and the infinite plane of one reflective surface 452 of the second prism 450 may correspond to a major angle, and the dihedral angle between the infinite plane of the other reflective surface 444 of the first prism 440 and the infinite plane of the other reflective surface 454 of the second prism 450 may correspond to a minor angle.

As described above, by implementing the second optical system 430 using a pair of prisms 440 and 450, the arrangement structure and design of the second optical system inside the case 410 can be further optimized. That is, compared to implementing the second optical system using a plurality of reflectors or mirrors inside the case 410, the implementation using a pair of prisms can allow the structure for disposing or fixing the second optical system inside the case 410 to be simpler, and can subsequently allow the internal structure of the case 410 to be denser.

Figure 5:
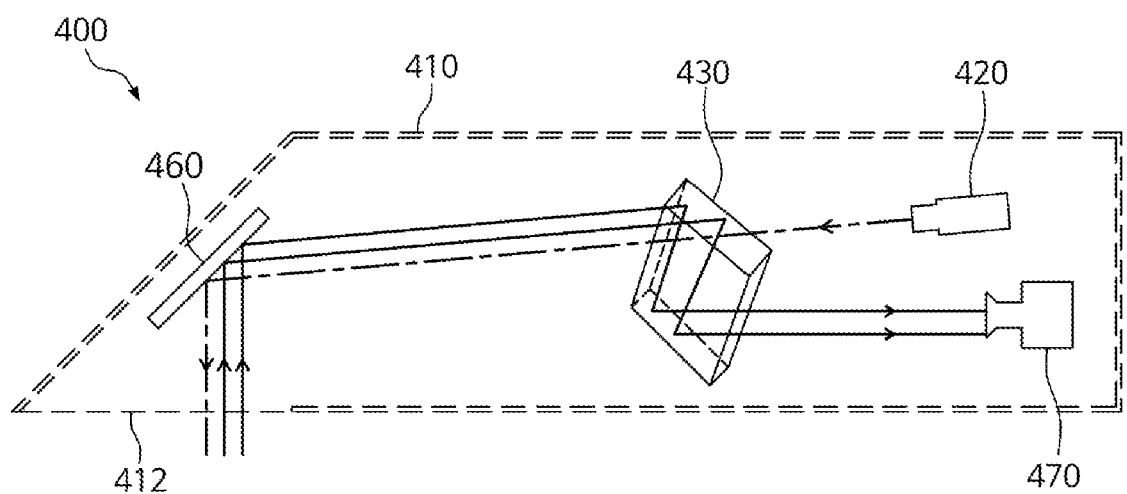
FIG. 5 is a transparent side view of the intraoral scanner.

FIG. 5 is a transparent side view of the intraoral scanner 400. The descriptions of the components shown in FIG. 5 that correspond to the components shown in FIGS. 2 and 4 will be omitted.

Light may be emitted from the light source unit 420 and pass through a gap between the first prism 440 and the second prism 450. The light passed through the gap may be reflected toward the subject by the first optical system 460. In this case, the light may pass through the open portion formed on one side of the opening 412. The light reflected from the subject may be reflected toward the second optical system 430 by the first optical system 460. The light reflected by the upper reflective surfaces of the first prism 440 and the second prism 450 may be reflected toward the image sensor unit 470 by the lower reflective surfaces of the first prism 440 and the second prism 450.

Additionally, the intraoral scanner 400 may acquire an image of the subject using light emitted from an additional light source other than the light source unit 420. For example, the light emitted from an additional light source installed in the intraoral scanner 400 or from an external light source may be reflected on the subject and reach the first optical system 460. The light reflected from the first optical system 460 may be sequentially reflected by the upper and lower reflective surfaces of the second optical system 430 and reach the image sensor unit 470.

Certain examples of the present invention have been described above for purposes of illustration only, and those skilled in the art with ordinary knowledge of the present disclosure will be able to make various modifications, changes and additions within the spirit and scope of the present disclosure, and such modifications, changes and additions should be construed to be included in a scope of the claims.

It should be understood that those of ordinary skill in the art to which the present disclosure pertains can make various substitutions, modifications and changes without departing from the technical spirit of the present disclosure, and thus, the present disclosure is not limited by the embodiments described above and the accompanying drawings.

The invention claimed is:

1. An intraoral scanner comprising:
a case including an opening formed at one end thereof;
a light source unit disposed at the other end of the case and emitting light toward the opening;
a first optical system disposed in the opening and reflecting the light emitted from the light source unit toward a subject and reflecting light reflected from the subject toward the light source unit;
a second optical system disposed between the light source unit and the first optical system and reflecting light reflected from the first optical system; and
an image sensor unit that detects the light reflected from the second optical system.

2. The intraoral scanner according to claim 1, wherein a gap is formed in a center of the second optical system such that the light emitted from the light source unit passes through the gap to reach the first optical system.

3. The intraoral scanner according to claim 1, wherein the second optical system includes:
a first reflector configured to reflect the light reflected from the first optical system; and a second reflector configured to reflect the light reflected by the first reflector toward the image sensor unit.

4. The intraoral scanner according to claim 3, wherein the first reflector includes two reflective surfaces configured such that a dihedral angle between each infinite plane forms a minor angle, and
the second reflector includes two reflective surfaces configured such that a dihedral angle between each infinite plane forms a major angle.

5. The intraoral scanner according to claim 4, wherein positions and directions of each of the two reflective surfaces of the second reflector are set such that two images of the subject reflected by the two reflective surfaces of the second reflector and detected by the image sensor unit do not overlap with each other.

6. The intraoral scanner according to claim 1, wherein the second optical system includes a first prism and a second prism,
the light emitted from the light source unit passes through a gap formed between the first prism and the second prism to reach the first optical system, and
the light reflected by the first optical system is reflected by a pair of opposing reflective surfaces of the first prism and a pair of opposing reflective surfaces of the second prism to reach the image sensor unit.

7. The intraoral scanner according to claim 6, wherein a dihedral angle between an infinite plane of one reflective surface of the first prism and an infinite plane of one reflective surface of the second prism forms a minor angle, and a dihedral angle between an infinite plane of the other reflective surface of the first prism and an infinite plane of the other reflective surface of the second prism forms a major angle.

8. The intraoral scanner according to claim 7, wherein positions and directions of the other reflective surface of the first prism and the other reflective surface of the second prism are set such that two images of the subject reflected by the two other reflective surfaces and detected by the image sensor unit do not overlap with each other.

9. The intraoral scanner according to claim 1, wherein the light source unit is configured to emit patterned light or structured light.

10. The intraoral scanner according to claim 1, wherein the image sensor unit is configured to acquire two stereo images from the image of the light reflected from the second optical system.

* * * * *